United States Patent [19]
Haynes

[11] 3,886,902
[45] June 3, 1975

[54] RECIRCULATING FISH RAISING TANK SYSTEM WITH CLEANABLE FILTER

[76] Inventor: Robert C. Haynes, 1607 Broadman St., Brownwood, Tex. 76801

[22] Filed: Jan. 2, 1974

[21] Appl. No.: 429,723

[52] U.S. Cl. .................................................. 119/3
[51] Int. Cl. ............................................ A01k 61/00
[58] Field of Search ................................. 119/2–5; 210/169; 55/223

[56] References Cited
UNITED STATES PATENTS
3,116,712  1/1964  Ogden et al. ............................ 119/3
3,418,973  12/1968  Saito ........................................ 119/5
3,638,616  2/1972  Carmouche ......................... 119/3 X Primary Examiner—Louis G. Mancene
Assistant Examiner—J. N. Eskovitz
Attorney, Agent, or Firm—Arthur M. Sloan

[57] ABSTRACT

A recirculating fish raising tank system for raising fingerlings to maturity has cleaning brushes for stirring up waste material on the bottom of each tank to let droppings through while keeping the fish off the bottom, means for pumping water from the tanks to the top of the filter, means for returning the filtered water to the tanks, and means for cleaning the filter including means for backflushing the filter and means for draining the filter.

6 Claims, 5 Drawing Figures

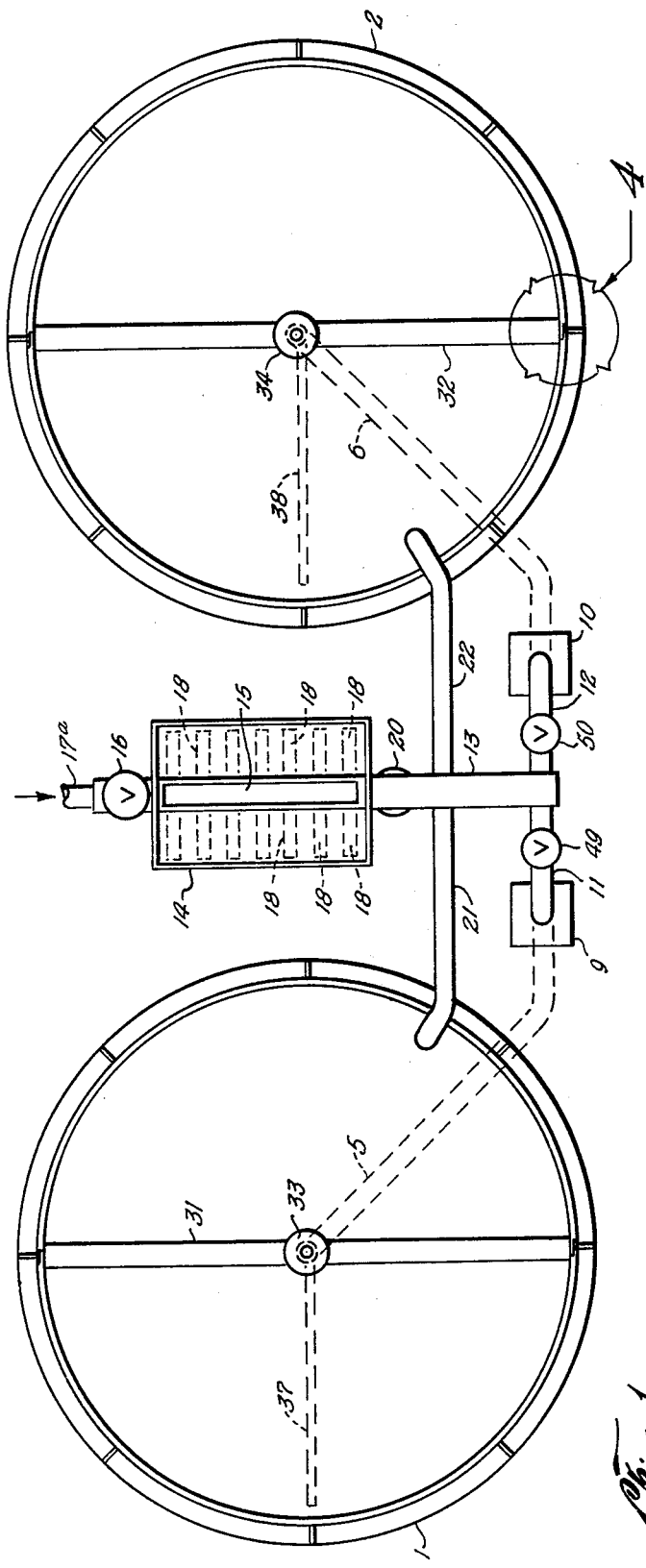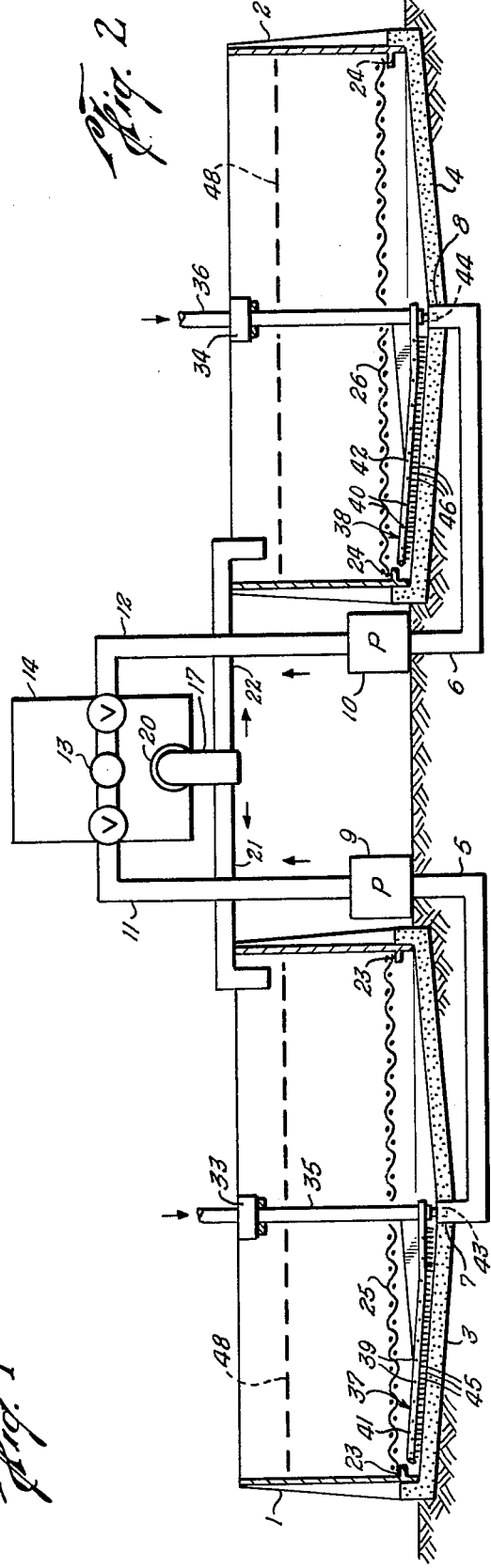

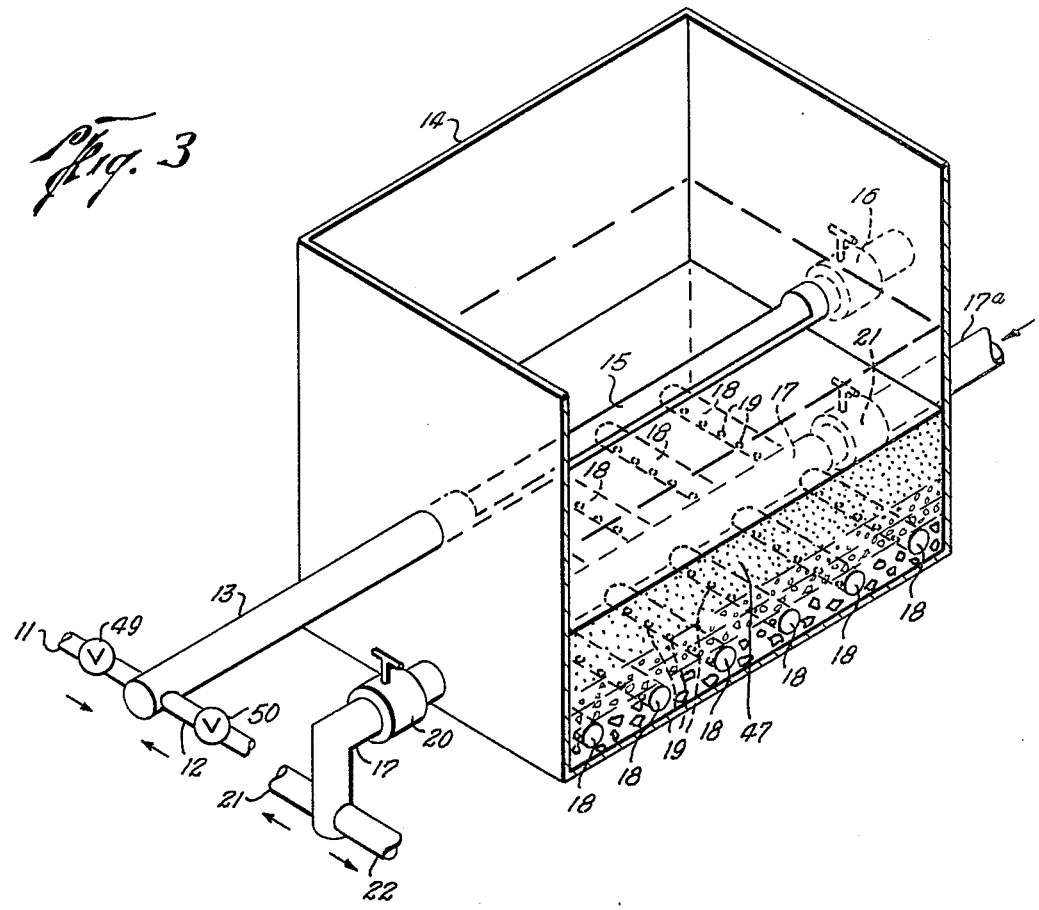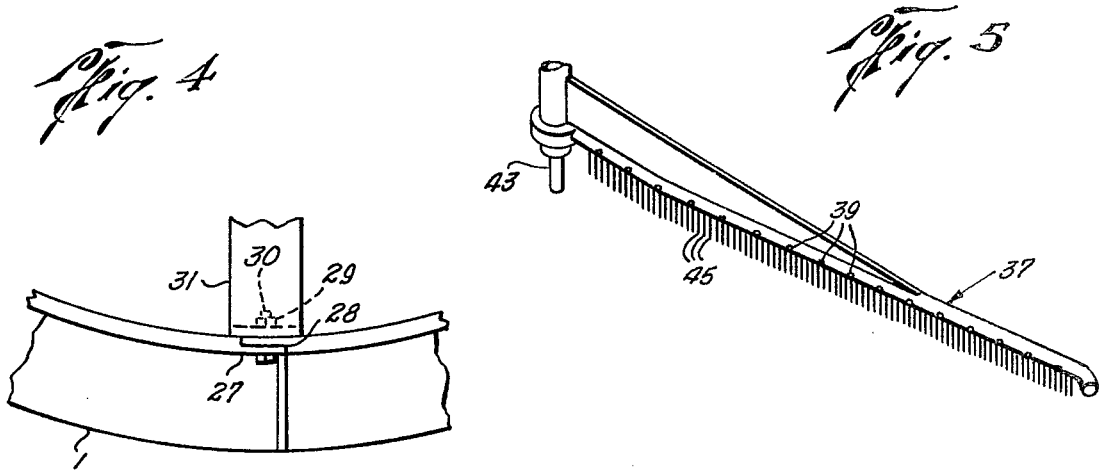

RECIRCULATING FISH RAISING TANK SYSTEM WITH CLEANABLE FILTER

This invention relates to a recirculating fish raising tank system for raising fish from fingerlings to maturity with an easily cleanable filter for providing clean water for maximum fish raising conditions.

The invention includes a backflushing and draining system for the filter to provide for efficient and speedy cleaning.

The tanks are provided with mesh screens to keep the fish from the bottoms of the tanks and to allow passage of the fish droppings to the bottom of the tanks.

The tanks are also provided with revolving cleaning brushes to keep the body droppings stirred up and to allow them to pass through the drain pipe and be pumped into the filter.

An object of the subject invention is to provide an improved recirculating fish raising tank system with cleanable filter.

Another object of the subject invention is to provide an improved recirculating fish raising tank system that provides a constant supply of clean water for raising the maximum number of fish per fish tank area.

Still another object of the subject invention is to provide a quickly and easily cleanable and efficient filter in a recirculating fish raising tank system.

Yet another object of the subject invention is to provide an improved recirculating fish raising tank system with means for separating the fish from their droppings.

A further object of the subject invention is to provide an improved recirculating fish raising tank system with means for brushing the fish droppings into a drain for conveyance to a filter.

Still a further object of the subject invention is to provide a recirculating fish raising tank system with sectional tanks which are easily assembled and disassembled for convenient storage and shipping.

To the accomplishment of the above and to such further objects as may hereinafter appear, the present invention relates to a recirculating fish raising tank system with cleanable filter substantially as defined in the appended claims and as described in the following specification taken together with the accompanying drawings in which:

FIG. 1 illustrates the recirculating fish raising tank system of the subject invention in a top view.

FIG. 2 illustrates the recirculating fish raising tank system of the subject invention in a partially cut away side view.

FIG. 3 is a partially cut away perspective view showing the filter of the recirculating fish raising tank system of the subject invention.

FIG. 4 is a partial view of a tank in accordance with the subject invention showing a construction joint and means for joining two sections of the tank together and fixing a brace across the top of the tank for retaining the compressed air inlet tube for the cleaning brush in a centered upright position in the tank.

FIG. 5 is a view of a cleaning brush in accordance with the invention showing the compressed air inlet.

Referring to the drawings in FIGS. 1 and 2, tanks 1 and 2 which are typically of glass fiber such as FIBERGLAS are shown set in cylindrical concrete bottoms 3 and 4 which are sloped or tapered downwards towards their centers. The tank bottoms may be constructed of suitable material other than concrete. Drain pipes 5 and 6 extend through holes 7 and 8 in the centers of concrete bottoms 3 and 4. Drain pipes 5 and 6 extend into pumps 9 and 10 which may be 1 H.P. electric pumps with 100 gallons per minute capacity. Pipes 11 and 12 extend from pumps 9 and 10 into pipe 13 which extends through filter box 14. Shut off gate valves 49 and 50 are connected into pipes 11 and 12. In place of valves 49 and 50 one similar valve may be inserted in pipe 13. Pipe 13 is cut away at 15 within filter box 14 so that water can spill over the sides of pipe 13 into filter box 14. Valve 16 is fixed on the outlet portion of the pipe 13 extending from the filter box 14. The valve 16 is opened only during the filter cleaning process.

Pipe 17 extends through the filter box 14 near the bottom of the filter box and beneath pipe 13. Numerous pipes 18 are butted into the sides of pipe 17 within the filter box 14. The pipes 18 have numerous holes 19. The pipe 17 has gate valve 20 on its outlet side and gate valve 21 on its inlet side. The inlet side of pipe 17 is used for backwashing or cleaning the filter. Outlet pipes 21 and 22 extent from pipe 17 and empty into tanks 1 and 2.

Tanks 1 and 2 have internal lips or flanges 23 and 24. Rings containing screens or strainers 25 and 26 typically of nylon mesh are supported over the drain holes 7 and 8 by the lips or flanges 23 and 24. The screens or strainers 25 and 26 let fish droppings or excrement through and keep the fish off the concrete bottoms 3 and 4.

Construction joints 27 and 28 are shown joining sections of tank 1 which are held together by nuts 29 and bolts 30 which also retain braces 31 and 32 across the tops of tanks 1 and 2.

The tanks are made in sections for purposes of easy assembly and disassembly and shipment and storage.

The braces 31 and 32 contain bushings 33 and 34.

Compressed air pipes or inlets 35 and 36 are centered in bushings 33 and 34. Cleaning brushes 37 and 38 are connected to compressed air pipes or inlets 35 and 36 and compressed air which is forced out through the holes 39 and 40 in pipes or tubes 41 and 42 causes the brushes to rotate or revolve thus effectively pushing droppings into the drains 5 and 6 from whence the droppings are carried into the filter box 14. The pins 43 and 44 extending from the bottoms of compressed air pipes or inlets 35 and 36 extend into the drains 5 and 6.

For filter material the filter box 14 may typically contain layers starting from the bottom of the box 14, the first layer being crushed limestone such as 8 inches of ¾ inch crushed limestone, the second layer being crushed limestone such as 8 inches of ½ inch crushed limestone, the third layer being whole or half oyster shells such as 8 inches of whole or half oyster shell, the fourth layer being river rock with smooth or round edges such as 8 inches of ¼ inch river rock, and the fifth layer being very coarse river sand such as 4 inches of coarse river sand.

The above filter mixture would remove the fish body waste from the water and neutralize the metabolites produced by the fish since the oyster shell and limestone mixture result in a bacterial concentration having such neutralizing effect.

As noted, the brushes 37 and 38 are pivotally centered in the drain pipes 5 and 6 by means of the pins 43 and 44 and swivel in water bushings 33 and 34 which are mounted in the braces 31 and 32 as compressed air is forced down the pipes 35 and 36 and through the small holes 39 and 40 so that the brush fibers or filaments 45 and 46 keep the fish body droppings stirred up and allow them to pass through the drain pipes 5 and 6 to be pumped into the filter material 47 in the filter box 14 by the pumps 9 and 10.

The compressed air which turns the cleaning brushes 37 and 38 also furnishes oxygen to the fish. Typically the amount of compressed air necessary to turn the cleaning brushes 37 and 38 and adequately aerate the water is from 5 to 7½ cubic feet per minute at 30 lbs. pressure.

The filter box 14 is typically mounted on legs (not shown) about 1 foot above the top of the tanks 1 and 2. Typical dimensions of a suitable filter box are 8 foot length, 5 foot width, and 6 foot height with 3 feet of filter material in the bottom. This arrangement with 15 foot diameter tanks 5 feet high would enable a breeder or farmer to raise 5 channel catfish per cubic foot of water up to 2 lbs. each in 150 to 180 days.

The most important fact about the filter system of the subject invention is the ability to clean it in a few minutes time. This is a decided improvement over prior art devices. Prior art devices have been tested and have been found to stop up and cut off the water supply contrary to the system of the subject invention.

With the subject invention, utilizing typical dimensions as indicated above, 12,000 lbs. of fish can be raised in 5 to 6 months.

To backwash the filter material 47 clean filtered water or clean well water is pumped into the inlet side 17a of the pipe 17 by means of a suitable pump (not shown) such as a 3 H.P. pump capable of pumping 150 gallons per minute of water with the valve 20 closed and the valve 21 partially opened; however, before pumping water into the inlet side 17a of the pipe 17, the filter is drained by opening valve 16 which is left open during the backwashing operation. Valves 49 and 50 in the pipes 11 and 12 are closed during the draining and backwashing operations. Water is pumped into the inlet side 17a slowly at first until waste material starts breaking away from the filter material 47 and the valve 21 is then opened more fully while the pumping rate is increased to about 2 inches per minute rise in water. The water in the filter box normally becomes clear in a few minutes time and when this happens valves 16 and 21 are closed and valve 20 and valves 49 and 50 in pipes 11 and 12 are opened to resume normal water circulation and filtering with water from drains 5 and 6 being pumped by pumps 9 and 10 through pipes 11 and 12 into pipe 13 and filter box 14 and back through pipe 17 and pipes 21 and 22 into tanks 1 and 2. Water level is indicated at 48.

Several variations of the system of the subject invention may be utilized. For example, electric valves and time clocks could be used and the operation could be made automatic; however, this modified automatic system would be too expensive for the average farmer.

Heaters or coolers may be installed in the system with thermostat control to keep constant water temperature.

Back up pumping systems operated with gasoline, butane, natural gas or other suitable fuel may be provided for use in case of electric power interruption since proper aeration and filtering is necessary to sustain the fish.

Although channel catfish have been specifically mentioned, and the system of the subject invention is peculiarly well suited for raising channel catfish on farms, other types of fish may be raised with the subject invention. For example, channel catfish could be raised in the summer and early fall and mountain trout in the winter and early spring. The fish droppings are collected and provide an excellent fertilizer.

Suitable food is introduced into the raising tanks in accordance with proper feeding procedures for the type of fish being raised.

What I claim as my invention and desire to secure by Letters Patent of the United States is:

1. A recirculating fish raising tank system with cleanable filter including a filter means, at least one tank, means for removing waste material from each tank and transmitting the waste material with water from each tank into the filter means, means for transmitting the filtered water back into the tank, means for aerating the water in each tank, and means for backwashing and cleaning the filter in which each tank has a bottom which is sloped downwards towards its center in which the means for removing waste material from each tank includes rotating brush means for stirring up the waste material on the bottom of each tank and a drain pipe extending down from the center of the bottom of each tank, in which the means for transmitting the waste material with water from each tank into a filter means includes, in addition to the drain pipe, pump means connected to the drain pipe and pipe running from the pump means into the upper part of the filter means, in which the means for transmitting the filtered water back into each tank includes a pipe running from the lower part of the filter means into each tank, said pipe having numerous perpendicular extensions each having structure defining holes, and in which the means for aerating the water in each tank is also the means for rotating the brush at the bottom of each tank and includes a free swivelling pipe mounted at the center and parellel to the sides of each tank through which compressed air is introduced, said pipe having an extension parallel to the bottom of each tank and structure defining numerous small holes in said extension, the brush elements also being mounted in said extension so that the compressed air emanating from the holes in the said extension aerates the water and causes the extension with attached brush elements to rotate.

2. A recirculating fish raising tank system with cleanable filter as described in claim 1 in which the means for backwashing and cleaning the filter includes first valve means connected to the pipe running from the drain at its side of inlet to the filter means from the drain, second valve means connected to the pipe running from the drain at its side of outlet from the filter means, third valve means connected to the pipe running from the lower part of the filter means into each tank at its side of outlet from the filter means, and fourth valve means connected to the pipe running from the lower part of the filter means into each tank at its side of inlet to the filter means wherein the first and third valve means are closed and the second valve means is opened after which the fourth valve means is opened and clean water is pumped into the pipe running from the lower part of the filter into each tank at its side of inlet to the filter means.

3. A recirculating fish raising tank system with cleanable filter as described in claim 2 in which the pipe running from the drain is cut away as it runs through the filter means so that water and waste can spill over the side within the filter means.

4. A recirculating fish raising tank system with cleanable filter as described in claim 3 including a mesh screen in which a flange extends within each tank near its bottom and the mesh screen rests on such flange to allow fish droppings to pass through to the bottom of the tank while keeping the fish off the bottom of the tank.

5. A recirculating fish raising tank system with cleanable filter as described in claim 4 in which the filter means includes filter material including layers going from top to bottom of coarse river sand, river rock, oyster shells, and crushed limestone.

6. A recirculating fish raising tank system with cleanable filter as described in claim 5 in which the bottom of each tank is concrete, and the sides of each tank are sectional for easy assembly and disassembly, storage, and shipping.

* * * * *